United States Patent
Chaudhuri et al.

(10) Patent No.: US 11,269,974 B1
(45) Date of Patent: Mar. 8, 2022

(54) LEARNING ORDINAL REGRESSION MODEL VIA DIVIDE-AND-CONQUER TECHNIQUE

(71) Applicant: Amazon Technologies, Inc., Reno, NV (US)

(72) Inventors: Sougata Chaudhuri, Mountain View, CA (US); Lu Tang, Palo Alto, CA (US); Abraham Hossain Bagherjeiran, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1138 days.

(21) Appl. No.: 15/799,613

(22) Filed: Oct. 31, 2017

Related U.S. Application Data

(60) Provisional application No. 62/556,133, filed on Sep. 8, 2017.

(51) Int. Cl.
| | | |
|---|---|---|
| *G06F 17/18* | (2006.01) | |
| *G06F 5/01* | (2006.01) | |
| *G06F 17/16* | (2006.01) | |
| *G06N 20/00* | (2019.01) | |

(52) U.S. Cl.
CPC .............. *G06F 17/18* (2013.01); *G06F 5/01* (2013.01); *G06F 17/16* (2013.01); *G06N 20/00* (2019.01)

(58) Field of Classification Search
CPC ............ G06F 17/18; G06F 5/01; G06F 17/16; G06N 20/00
See application file for complete search history.

(56) References Cited

U.S. PATENT DOCUMENTS

| | | | |
|---|---|---|---|
| 10,552,002 B1* | 2/2020 | Maclean | G06F 3/04817 |
| 2014/0108417 A1* | 4/2014 | Chakrabarti | G06Q 30/02 |
| | | | 707/741 |
| 2018/0357541 A1* | 12/2018 | Chen | G06F 9/5016 |

OTHER PUBLICATIONS

Lian et al., "Divide-and-Conquer for Debiased l1-norm Support Vector Machine in Ultra-high Dimensions", Jan. 2017, Journal of Machine Learning Research 18, pp. 1-26 (Year: 2017).*
Battey et al., "Distributed Estimation and Inference with Statistical Guarantees", Sep. 17, 2015, arXiv:1509.05457, pp. 1-57 (Year: 2015).*

* cited by examiner

*Primary Examiner* — Vincent Gonzales
*Assistant Examiner* — Brent Johnston Hoover
(74) *Attorney, Agent, or Firm* — Hogan Lovells US LLP

(57) ABSTRACT

Embodiments of the present invention provide a divide-and-conquer algorithm which divides expanded data into a cluster of machines. Each portion of data is used to train logistic classification models in parallel, and then combined at the end of the training phase to create a single ordinal model. The training scheme removes the need for synchronization between the parallel learning algorithms during the training period, making training on large datasets technically feasible without the use of supercomputers or computers with specific processing capabilities. Embodiments of the present invention also provide improved estimation and prediction performance of the model learned compared to the existing techniques for training models with large datasets.

20 Claims, 6 Drawing Sheets

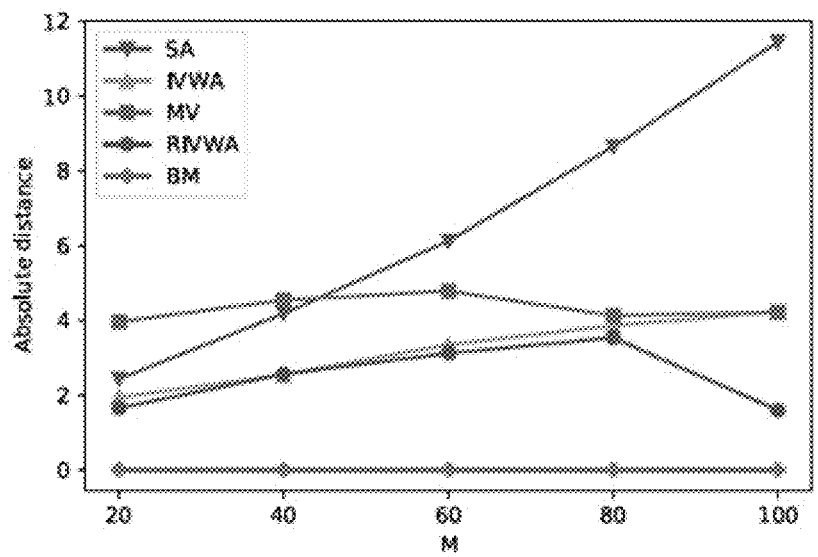
FIG. 3(a) Absolute distance from BM, $d_1$
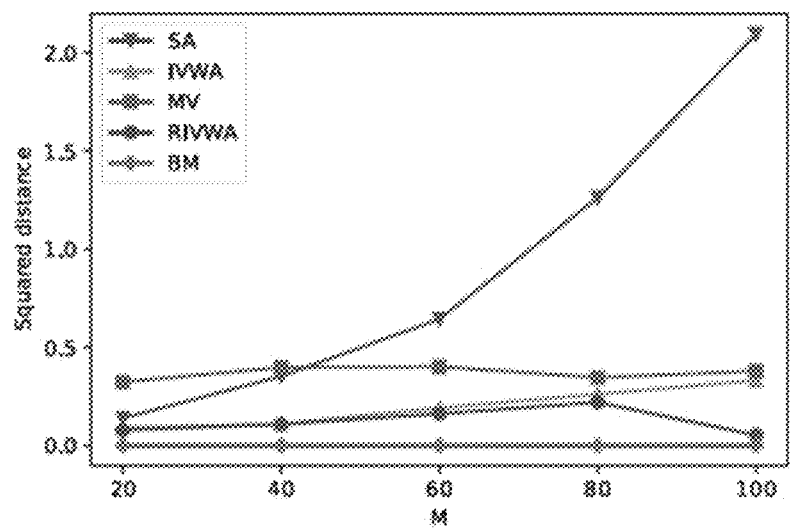
FIG. 3(b) Squared distance from BM, $d_2$

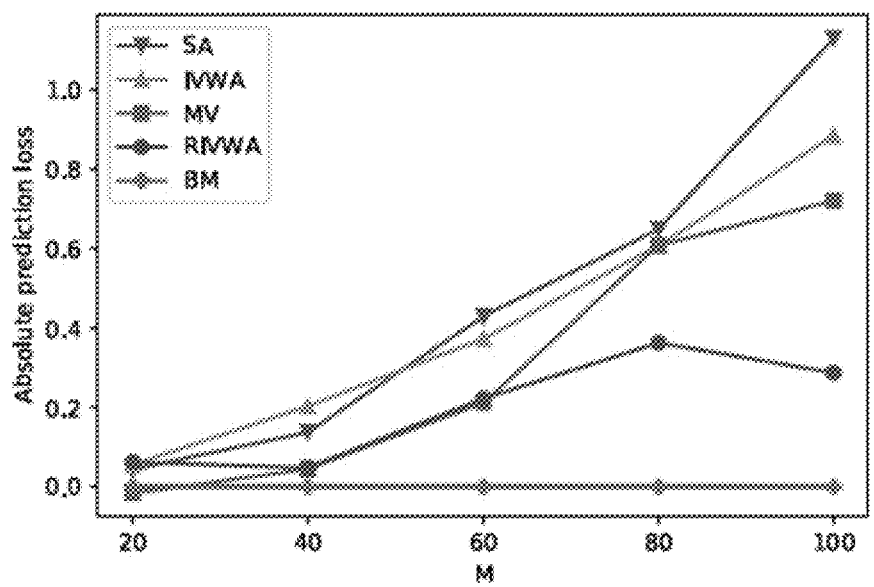
FIG. 3(c) Percentage change in absolute prediction loss, abs_loss($Y_{test}, \hat{\theta}$), with respect to BM
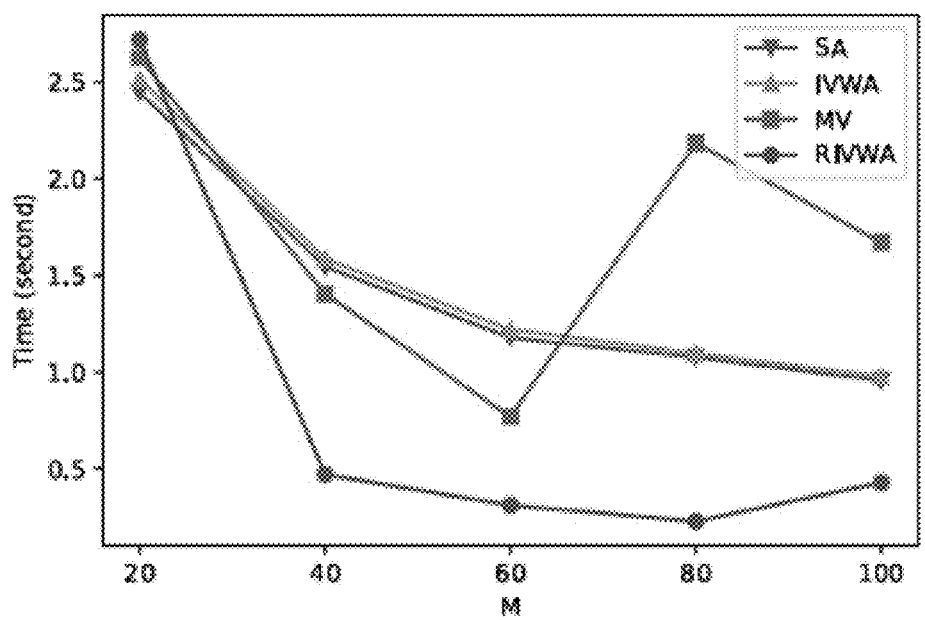
FIG. 3(d) Computation time in seconds

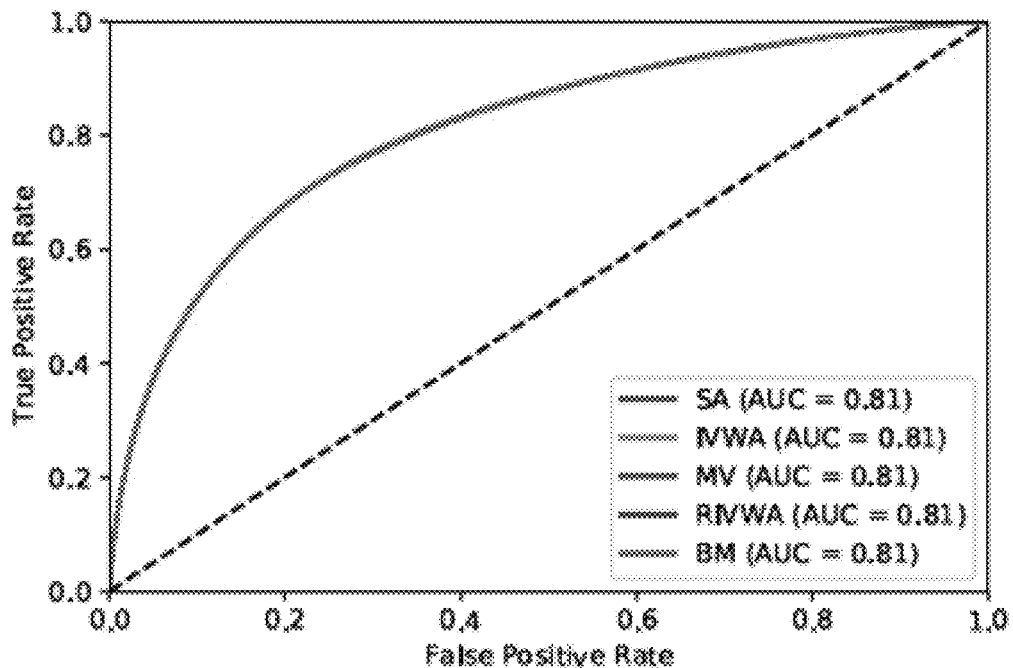
FIG. 4(a) $M = 200$
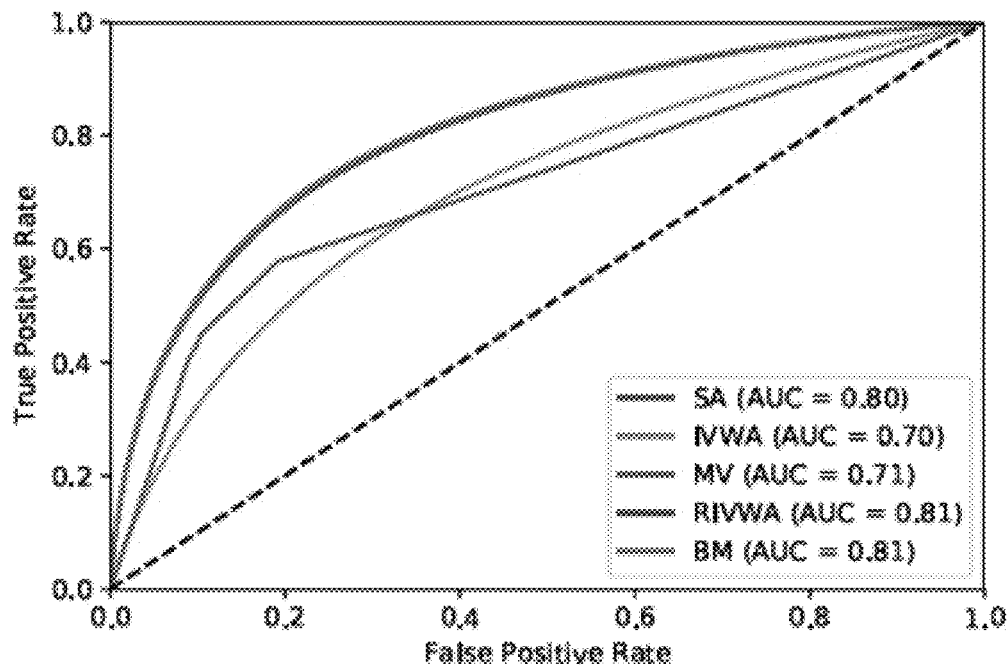
FIG. 4(b) $M = 1000$

LEARNING ORDINAL REGRESSION MODEL VIA DIVIDE-AND-CONQUER TECHNIQUE

RELATED APPLICATIONS

This application is a non-provisional of U.S. Application No. 62/556,133, entitled "LEARNING ORDINAL REGRESSION MODEL VIA DIVIDE-AND-CONQUER TECHNIQUE" filed Sep. 8, 2017, of which the full disclosure is incorporated herein by reference for all purposes.

BACKGROUND

As users increasingly access content electronically and conduct transactions electronically over the Internet, content providers are presented with the problem of processing extremely large amounts of user data in an efficient and intelligent manner to improve the way in which content is delivered to these users. Processing and analyzing user data is critical for training models to predict user behavior using limited amounts of historical data as input. Many content providers specifically select content for certain pages or other interfaces to be displayed to particular users. For example, a user might search for information about a keyword through a search engine. When a results page is returned to the user that includes search results relating to that keyword, content that may be of interest to the user and relevant to the search can be included with the results page that relates to the keyword and/or search results. Often, the content includes a hypertext link or other user-selectable element that enables the user to navigate to another page or display relating to the advertisement.

In conventional approaches, large amounts of data may be stored and analyzed using a single computer equipped with sufficient processing power, which can be costly, inefficient, or inaccurate because of biases trained into the model. Other conventional approaches may divide the data into more digestible blocks for training individual models and then the individual models may be averaged or merged. However, averaging or margining individual models often introduces unnecessary variances and biases, which also results in inaccurate models for user behavior. For example, a user may be associated with a category when the user visits a page, performs a search, or views content associated with that category. For example, a user viewing a page of content relating to cameras may be associated with a camera category and thus may receive advertising relating to cameras. However, the user may have been looking for something only tangentially related to cameras, or might have only visited a camera page once for a particular reason. Thus, conventional approaches do not optimally reflect the interests of various users, and do not allow advertisers to easily determine the appropriate users, or categories of users, to target.

BRIEF DESCRIPTION OF THE DRAWINGS

Various embodiments in accordance with the present disclosure will be described with reference to the drawings, in which:

FIGS. 3(a)-(d) illustrate results of an example method where a dataset is divided into different numbers of subsets in accordance with one embodiment;

FIGS. 4(a)-(b) illustrate results of an example method of a divide-and-conquer technique used on a dataset in accordance with one embodiment.

DETAILED DESCRIPTION

Figure 1:
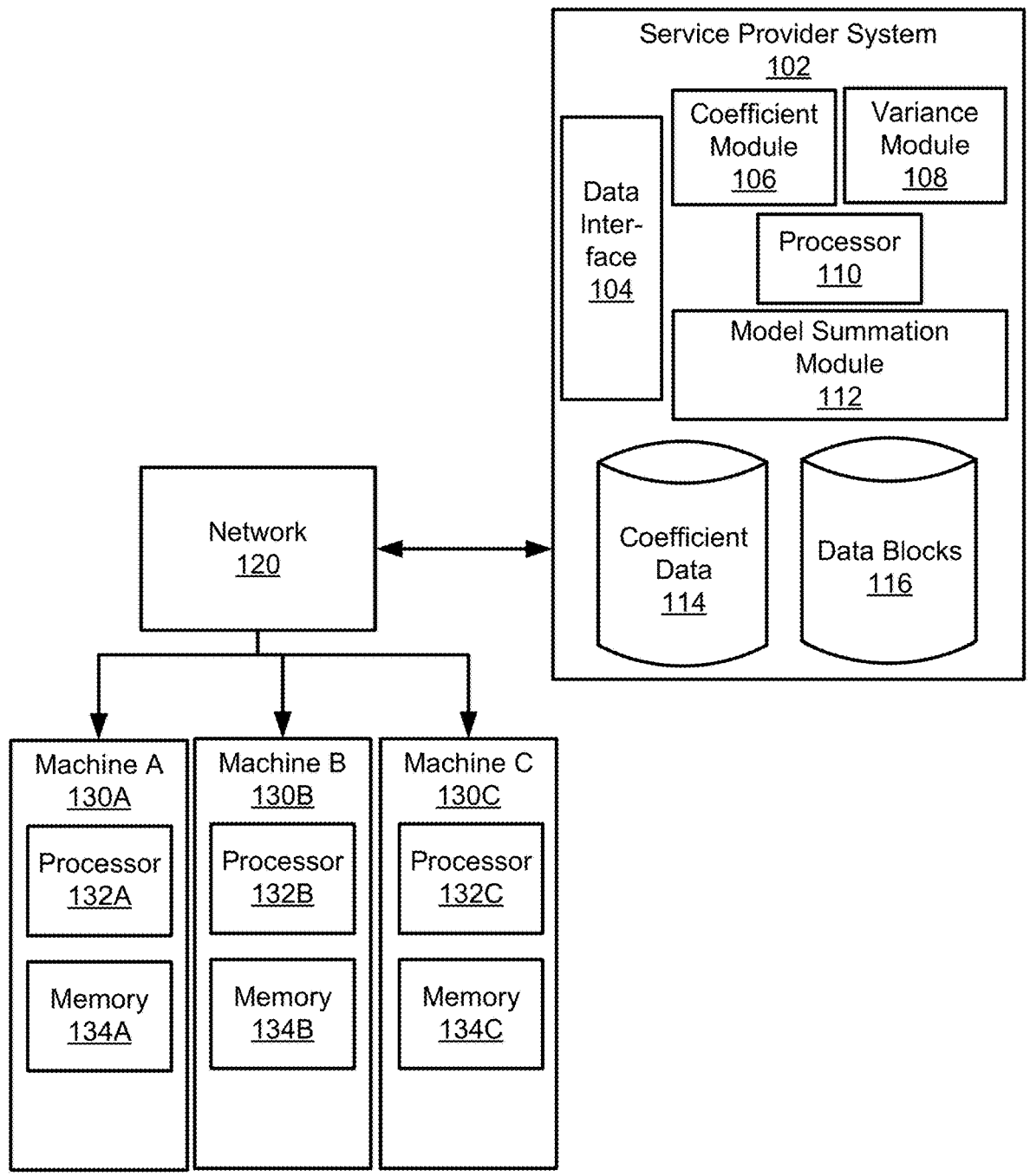
FIG. 1 illustrates an example overview method of a divide-and-conquer technique in accordance with one embodiment.

Systems and methods in accordance with various embodiments of the present disclosure may overcome one or more of the aforementioned and other deficiencies experienced in conventional approaches to process and analyze large amounts of data, and train models to predict behavior using a limited amount of data as input. In particular, various embodiments provide ordinal regression models to establish functional relationships between predictors and ordinal outcomes, that is, outcomes which are categorical and have a ranked order. Ordinal regression models use a form of regression analysis to predict an ordinal variable, which is a variable with a value that exists on an arbitrary scale where only the relative ordering between different values is different. For example, ordinal regression may be used to model human levels of preference or ratings on a scale, e.g., a scale of 1-5, with 1 being "poor" and 5 being "excellent." Ordinal regression models may also be used in information retrieval to classify or rank information. Due to extensive applicability of the models, developing efficient techniques to train the models may be difficult, costly, time-consuming, and inaccurate. According to an embodiment, training ordinal regression models may reduce the problem to a binary classification problem, which facilitates the usage of readily available, powerful binary classifiers. Embodiments of the present disclosure provide a systematic reduction technique and improve the structure and properties of the ordinal model trained from the binary data.

However, the reduction procedure necessitates an expansion of the original training data, where the training data increases by K−1 times of its original size, with K being the number of ordinal outcomes. In the era of big data, where training sets are usually large scale in nature, such expansion can introduce computational challenges and may even make it infeasible to train the model on a single machine. Embodiments of the present disclosure provide a divide-and-conquer (DC) algorithm. The DC algorithm of the present invention, in an embodiment, divides the expanded data into a cluster of machines and trains logistic classification models in parallel, and then combines them at the end of the training phase to create a single ordinal model. The training scheme removes the need for synchronization between the parallel learning algorithms during the training period, making training on large datasets technically feasible without the use of supercomputers or computers with specific processing capabilities. Other advantages include improvements in cost reduction, efficiency, and accuracy. Embodiments of the present invention provide consistency and asymptotic normality property of the model learned using the DC algorithm according to embodiments of the present invention. Embodiments of the present invention also provide improved estimation and prediction performance of the model learned compared to the existing techniques for training models with large datasets.

FIG. 1 illustrates an example overview block diagram of system 100 for processing data in accordance with an embodiment. The system 100 may include a data processing or service provider system 102 that is connected to a network 120, such as the Internet or any other telecommunications or communications network. The network 120 can be any network to which devices, systems, servers, computers, etc. can connect to in order to communicate with each other. Multiple machines, such as Machine A 130A, Machine B 130B, and Machine C 130C, may be connected to the network 104. Each machine 130A, 130B, and 130C may have a corresponding processor 132A, 132B, 132C and a memory 134A, 134B, 134C, on which each corresponding machine can store and process data blocks. The machines 130A, 130B, and 130C may be operated by and be part of the service provider system 102, or in other embodiments alternatively may be operated by and be part of an external entity to which the service provider system 102 is in communication with.

According to various embodiments of the invention, the service provider system 102 may interface with the network 120 through a data interface 104. The data interface 104 may be in communication with an external entity that collects raw ordinal data associated with a plurality of users. The data interface 104 may initially process the large amounts of raw ordinal data to divide them into data blocks, which can be referenced, stored, and/or indexed in data blocks database 116. In some embodiments the raw ordinal data may be collected by the service provider system 102 and processed by the data interface 104. The service provider system 102 may include a processor 110 and a memory with executable instructions that perform specific functions. For example, the service provider system may include a coefficient module 106 that is configured with executable code to compute regression coefficients and de-biased coefficient vectors for each data block identified in data block database 116 trained on each machine 130A, 130B, and 130C. The coefficients and coefficient vectors may be stored in coefficient data 114 for the variance module 108 to use to calculate a robust inverse variance for each data block identified in data block database 116 trained on each machine 130A, 130B, and 130C. The service provider system 102 may then include model summation module 112 that utilizes the regression coefficients, inverse variance, and de-biased coefficient vectors for each data block identified in data block database 116 trained on each machine 130A, 130B, and 130C to create a single model by summing them in a weighted fashion according to embodiments of the present invention.

According to various embodiments of the invention, the service provider system 102 may include machines 130A, 130B, and 130C. The service provider system 102 may also include modules that are enabled to collect and aggregate raw ordinal data associated with a plurality of users. In some embodiments, each machine 130A, 130B, and 130C may have a corresponding coefficient module, variance module, and coefficient data database. The service provider 102 may communicate with the machines 130A, 130B, and 130C in transmitting data blocks that have been divided by data interface 104. Machines 130A, 130B, and 130C may then individually, separately, and independently generate a model that is trained on their corresponding data block. For example, each machine 130A, 130B, and 130C, for its corresponding data block, may each calculate the regression coefficient, the inverse variance, and de-biased coefficient vector. The machines 130A, 130B, and 130C may then transmit the generated models back to the service provider system 102 for a weighted summation of the models by model summation module 112. In some embodiments, the service provider system 102, or another third party entity, may also have a user information database, which may be cross-referenced with raw ordinal data that is divided into data blocks referenced, stored, indexed, or identified in the data blocks database 116. The models generated by each machine 130A, 130B, and 130C training on each data block and summed by the model summation module 112 may be used to create predictive models on user behavior, advertising campaigns, marketing campaigns, media content trends, etc.

Figure 2:
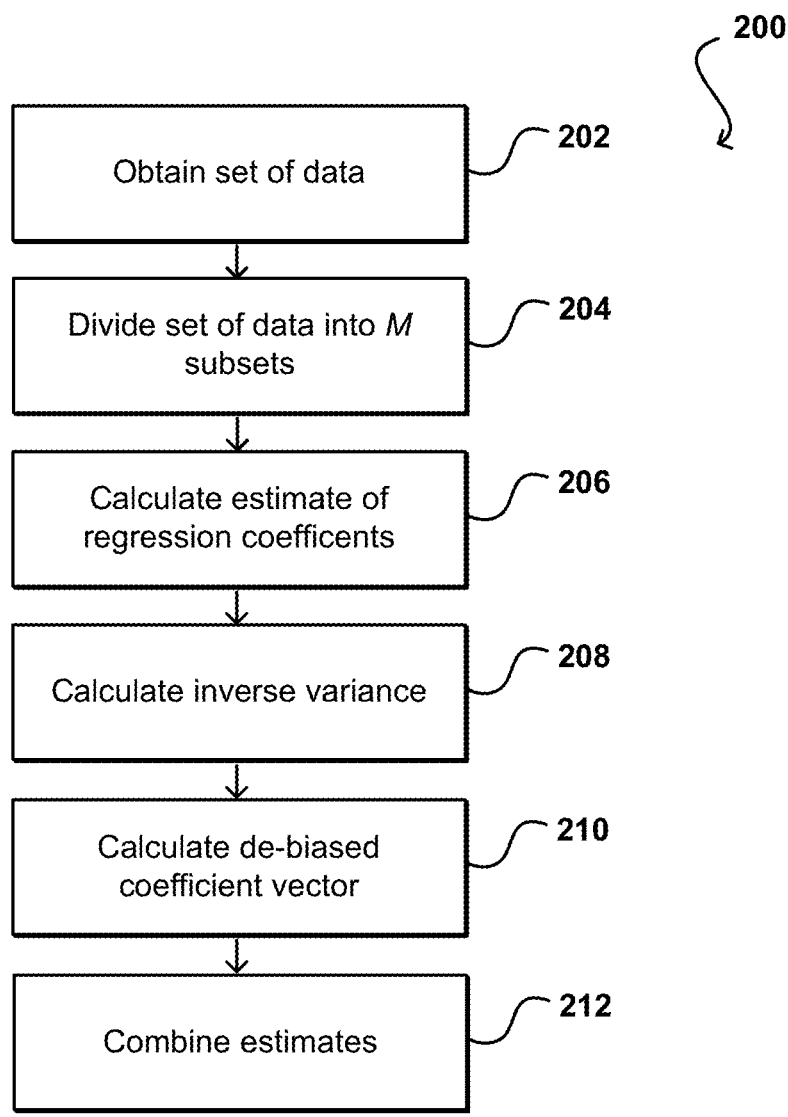
FIG. 2 illustrates an example overview method of a divide-and-conquer technique in accordance with one embodiment.

FIG. 2 illustrates an example overview method 200 of a DC technique in accordance with an embodiment. At 202, a computing system may obtain a set of ordinal data. The set of data can include various user data and other raw ordinal data (e.g., ratings for movies, advertising data, insurance data, etc.), and may be gathered by the system or obtained from a third party entity storing the data. The computing system may be operated by a media content provider, advertising provider, or other service provider. To improve user experience, the service provider may, by analyzing and aggregating historical ordinal data on user preferences, generate predictions on user behavior. The user behavior predictions may be implemented in various applications, such as providing recommendations to users based on previous preferences and experiences, customizing advertising campaigns, providing targeted marketing campaigns, and/or analyzing market trends for products, services, media, etc.

The ordinal user data may be collected, aggregated, and analyzed to establish functional relationships between predictors and ordinal outcomes. To illustrate, ordinal models are trained to determine the relationship between events, such as viewing an advertisement to a click on the advertisement, a viewing of a product in the advertisement, and/or a purchase transaction of the product in the advertisement. In this example, depending on the advertising campaign, the advertising service may be getting paid to show impressions of ads, so its goal may be to increase the presence of its ads. Alternatively, the goals of the ad campaign may be to increase the number of clicks, click-throughs (purchases made through clicks on the ad), or purchases outside of the clicks. Other goals may include driving purchases of very specific products, specific vendors, etc. As such, depending on the application in which the ordinal data is being analyzed for creates a structure of the predictions for which to apply the ordinal model. In existing technology, normal classification only predicts two categories, however embodiments of the present invention are improved over normal classification because in the present invention categories can be ranked and distinguished into more than just two categories. For example, a purchase of a product is better than a click on an advertisement and a click is better than just a view of the advertisement.

However, in processing and analyzing large amounts of data, many technical obstacles arise, such as limitations in memory or storage, processing capabilities, accuracy of the data analysis, and efficiency/speed of the analysis. As such, according to an embodiment of the present invention, at 204, the large set of data may be divided into M portions, where each portion is processed and analyze in parallel. The advantages of dividing the large set of data into portions is two-fold in that, first, each portion is a more manageable size to process and analyze, and second, parallel processing reduces the overall processing time of the entire set of data. Each portion may be transmitted to a separate computing resource in a fleet or plurality of computing resources for processing. In some embodiments, the set of data may be divided equally or based on size for particular computing resources and their processing capability or availability. The computing resources may include machines, servers, cloud resources, virtual resources, or any other suitable computing or processing resource, etc. In various embodiments, the computing resources may be in communication with and in synchronization with each other. In other embodiments, the computing resources may be running separately and independently from each other.

At 206, for each portion of data, the computing system may calculate an estimate of regression coefficients. A regression coefficient is a value that represents the rate of change of a variable as a function of changes in another. For example, in a linear equation, the regression coefficient is the slope of the line. According to embodiments of the invention, the estimated regression coefficient may be a constant value indicating a rate of change the raw ordinal data, and may be calculated to include a penalty factor. Adding penalty factors into the estimate regression coefficient analysis eliminates the effect of outliers in the set of data.

At 208, for each portion of data, the computing system then calculates a robust inverse variance, which aggregates two or more random variables to minimize the variance of a weighted average. Inverse variance may be used in combining results from independent measurements where significant variances may exist.

At 210, the system then calculates the de-biased coefficient vector for each portion of data, which may be an approximation of the regression coefficient when there is no penalty factor. The de-biased coefficient vector and robust inverse variance may be obtained for each portion of data in parallel. Lastly, at 212, the robust inverse variance and de-biased coefficient vector for each portion of data is summed to obtain a robust inverse variance weighted average of the entire set of data.

Embodiments of the overview method described in FIGS. 1 and 2 will be described in more detail below. As users increasingly access content electronically and conduct transactions electronically over the Internet, content providers are presented with the problem of processing extremely large amounts of user data in an efficient and intelligent manner to improve the way in which content is delivered to these users. For example, a movie provider system may request users to rate movies they have viewed on a scale of 1 star to 5 stars, with 1 star being "very poor" and 5 stars being "excellent." As such, each movie in the movie provider system's database would have an aggregate rating score collected from individual users. In another example, a customer service provider may request users to rate the service received from 1 to 5, with 1 being "I would not recommend" to 5 being "I would highly recommend to others." This set of ordinal user data can be extremely large and unwieldy to parse, sort, and analyze, because of the immense amount of data to process and for various applications. Depending on the service provider's (e.g., movie provider) needs, the data may be analyzed for each individual user to establish trends and preferences for that particular user based on their ratings for movies, for example. The service provider may then be able to predict the user's behavior and tastes to customize advertising or recommendations for the particular user that are more likely to be relevant for that particular user. In another example, the service provider (e.g., movie provider) may analyze data by the movie, to establish overall ratings and trends in genres or types of movies that are becoming more popular. The service provider may then be able to design targeted marketing campaigns for specific demographics, for example.

Thus, learning to rank ordinal outcomes is an important task in many applications where outcomes are categorical and ordered in nature. For example, customer rating may be categorized with the following options and order: highly satisfied, satisfied, neutral, dissatisfied, and highly dissatisfied. The natural ordering of outcomes distinguishes ordinal regression from general multinomial regression where outcomes are categorical but nominal in nature.

According to various embodiments, a binary classification approach for training models may be used to obtain ordinal outcomes. As an example, a content provider or retail provider may consider the satisfaction level of a user for a product, with five possible levels. By asking the question "is the satisfaction level for the user greater than level k", the provider can get a binary classification problem for a fixed k, since the answer would be binary, for example, yes or no (e.g., 1 or 0). By varying k=1, 2, 3, 4, for each user, the provider may have four different binary classification problems. According to various embodiments, the main advantage of reducing ordinal regression problem into binary classification problem is that it facilitates the usage of well-tuned binary classifiers available with standard libraries.

A number of algorithms may be implement to train ordinal regression models, with the algorithms sharing the property of being inspired or modified from binary classification approaches. Existing technologies include the systematic ordinal to binary classification reduction technique, in which a reduction and training scheme is implemented so that all the binary classification problems are solved jointly to obtain a single binary classifier. A simple step is then used to convert the binary outputs to an ordinal rank, which also leads to an immediate generalization analysis.

While this reduction technique is efficient and only one binary classifier needs to be trained on the expanded classification data, the reduction step, however, involves a necessary expansion of instance space, i.e., it artificially expands the training set by K−1 times of its original size, where K is the number of ordinal outcomes. In the era of big data, where training sets are usually quite large, it might be impossible to store the expanded data on a single machine. Even if storage is not an issue, since the data cannot be loaded into main memory, the computational time required to train a model, by reading data in chunks from the secondary storage and iterating, may be substantially higher and might not be within acceptable time limits. An ad-hoc solution may include down-sampling the expanded data (especially if the classes are highly imbalanced); however such methods are not governed by strong theory and can lead to loss of important information.

Divide-and-conquer methods according to embodiments of the present invention may be used for fitting logistic classification models. DC methods for logistic classification methods may include partitioning the full dataset into M separate parts, obtaining coefficient estimates from each part, and combine the M sets of estimates to get the final result. DC methods according to various embodiments may be more efficient because no synchronization is required between individual learning algorithms, leading to true parallel learning. DC methods according to various embodiments greatly reduce the computation time required by other existing methods, such as Newton's method, stochastic gradient descent, and mini-batch gradient descent.

Existing DC methods simply take the average of the estimates as $$\hat{\theta} = \frac{1}{M}\sum_{m=1}^{M}\hat{\theta}_m$$

where $\hat{\theta}_m$ is the linear classifier coefficient estimate from the m-th data partition. However, existing DC methods have been shown to produce high variance in the combined estimator, whereas DC methods of the present invention reduce and minimize variance.

Other existing DC methods calculate an inverse variance weighted average (IVWA) of the separate estimates as:

$$\hat{\theta} = \left(\sum_{m=1}^{M} \hat{\Sigma}_m^{-1}\right)^{-1} \sum_{m=1}^{M} \hat{\Sigma}_m^{-1} \hat{\theta}_m, \text{ where } \hat{\Sigma}_m$$

is the estimated variance-covariance matrix of $\hat{\theta}_m$. For logistic regression $$\hat{\Sigma}_m = \{X_m^T V_m(\hat{\theta}_m) X_m\}^{-1},$$

where $X_m$ is the m-th block feature matrix, and $V_m(\theta)$ is a diagonal matrix with diagonal element: $v_m(\theta)_{i,i} = \sigma(X_m^T \theta)\{1-\sigma(X_m^T \theta)\}$, where $\sigma(x)=1/(1+e^{-x})$ is the sigmoid function. This estimator provides theoretical efficiency in the sense that the DC estimator can achieve the smallest variance possible, which is the variance achieved by the benchmark of directly training on the full data. However, due to overfitting issues resulting from a lack of regularization, the empirical results usually show larger variance than the benchmark.

To enforce sparsity, a majority voting method may select the most frequently identified features from lasso regressions of across all data divisions. The method according to various embodiments returns nonzero results only for features that are identified across a majority of data parts, and let the rest be zero. The combination step can be represented by:

$$\hat{\theta} = A\left(\sum_{m=1}^{M} A^T \hat{\Sigma}_m^{-1} A\right)^{-1} \sum_{m=1}^{M} A^T \hat{\Sigma}_m^{-1} AA^T \hat{\theta}_m,$$

where A is a column-wise slicing of an identity matrix $I_D$ with columns $$\left\{j: \sum_{m=1}^{M} 1[\hat{\theta}_{m,j} \neq 0] > v\right\}$$

for some voting threshold $$v. \hat{\Sigma}_m$$

is estimated by plugging in the lasso estimates $\hat{\theta}_m$. Due to the sparseness of $\hat{\theta}_m$, this method is numerically robust. However, it requires tuning of two parameters: the lasso regularization parameter and the voting threshold v. Additionally, the combined estimator $\hat{\theta}$ is biased due to the biasedness of $\hat{\theta}_m$, where m=1, . . . , M.

For a binary logistic regression, with instance $x \in \mathbb{R}^D$ and label $y \in \{0,1\}$, the binary classifier f(x) may be parameterized by $\beta \in \mathbb{R}^D$, i.e., $f(x)=x^T\beta$. The loss (or the negative log likelihood) function of a training dataset may be represented by:

$$\sum_{i=1}^{N} \{\log(1 + e^{f(x_i)}) - y_i f(x_i)\} \quad (1)$$

where N is the training sample size, and the estimated coefficient vector $\hat{\beta}$ is the maximizer to Equation (1).

A K class ordinal regression problem may be defined by an instance $x \in X \subseteq \mathbb{R}^D$ and label $y \in y\{1, 2, \ldots, K\}$, where $1 \leq 2 \leq \ldots \leq K$. In this example, the objective may be to learn a ranking rule $r:X \mapsto y$, which may minimize a cost function $C_{y,r(x)}$, in expectation of joint distribution over X and Y. Each instance and label pair $(x_i, y_i)$ may be reduced to a binary classification pair (along with introduction of a weight) by the following equations:

$$x_i^k = (x_i^T, e_k^T)^T \in \mathbb{R}^{D+K-1},$$

$$y_i^k = 1[k<y],$$

$$w_i^k = |C_{y_i,k} - C_{y_i,k+1}|, \quad (2)$$

for k=1, . . . , K−1, where $C_{y,k}$ may be the loss function for assigning an outcome of k when the actually value is y, and $e_k$ is the standard basis vector in dimension K−1. As a result, the original sample size expands from N to (K−1)N. Subsequently, a logistic classifier f(·) may be trained on the expanded training set by minimizing the new loss function, which may be represented as:

$$\sum_{i=1}^{N} \sum_{k=1}^{K-1} w_i^k \{\log(1 + e^{f(x_i^k)}) - y_i^k f(x_i^k)\} \quad (3)$$

Equation (3) may be viewed as the loss (negative log likelihood) of a set of training data with sample size $\tilde{N}=(K-1)N$, feature dimension $\tilde{D}=D+K-1$, and sample weights may be specified by $w_i^k$. The solution to Equation (3) may lead to a classifier f(·) of the form $f(·)=(g(·), b_1, b_2, \ldots, b_{K-1})$, where g is defined by a parameter vector $\beta \in \mathbb{R}^D$ $(g(x)=x^T\beta \mapsto \mathbb{R})$, where $\{b_1, b_2, \ldots, b_{K-1}\}$ are bias terms. As such, f( ) may be represented as a linear function with parameter $\theta \in \mathbb{R}^{\tilde{D}}$ as $\theta=[\beta, b_1, \ldots, b_{K-1}]^T$, with $f(x^k)=x^{kT}\theta=x^T\beta+b_k$. When $C_{y,r(x)}$ is convex, the bias terms are rank monotone such that $b_1 \geq b_2 \geq \ldots \geq b_{K-1}$, therefore $f(x^1) \geq f(x^2) \geq \ldots \geq f(x^{K-1})$. This justifies the ranking rule of predicting the rank of a new instanced $x^* \in \mathbb{R}^D$ by the representation:

$$r(x_*) = 1 + \sum_{k=1}^{K-1} 1[f(x_*^k) > 0] \quad (4)$$

However, the convex absolute loss $C_{y,r(x)}=|y-r(x)|$ may be factored in the reduction to binary classification to ensure the biases to be rank monotone. As a result, for all i, k.

According to various embodiments, the reduction technique is the expansion of the training set, as evidenced in Equation (2). The training set increases by K−1 times its original size. Even for moderately large datasets, such expansions may lead to greater computational burden. It might become cumbersome to store the expanded dataset in a single machine or computing resource, or at least, load it into the main memory, which may lead to substantial increase in training time. Alternatively, if the full training dataset were partitioned and trained on the individual parts, each part may have insufficient sample size to yield a stable coefficient estimate due to overfitting, resulting in poor quality of the combined estimate. Additionally, regularized methods that prevent overfitting usually give biased estimates such that the combined estimate is also biased. Embodiments of the present invention resolve the technical problems that arise from using existing regularized methods by using robust inverse variance weighted average (RIVWA) method.

The DC estimator methods according to embodiments of the present invention provide estimation consistency and asymptotic normality properties in comparison to the benchmark method of using the full data with regularize estimators. As discussed, major challenge for regularized estimators of existing DC methods is that they are biased; thus, the combined estimate often lacks theoretical guarantees in terms of consistency. Regularized estimators may bootstrap subsampling idea to estimate and correct for the bias of DC estimators. However, the method according to various embodiments derives the closed form expression of the bias of $l_1$ regularized logistic regression, and directly corrects the bias within each data part before combining the results.

Another challenge with existing techniques is in processing large amounts of data, because the data can be so large that it usually cannot be stored in a single machine or computing resource on which to train the models. In existing DC techniques, in processing a large amount of data (e.g., ten gigabytes of data), a portion of that data may be taken out to train on the model (e.g., one gigabyte out of ten). However, with existing DC techniques, using only one gigabyte of the entire ten gigabytes of data to train on can lead to inefficient training where significant portions of data are discarded and the discarded (e.g., remaining nine gigabytes of data) may contain important signals in terms of predictability.

In an illustrative example, a service provider (e.g., media content provider, online marketplace provider, insurance provider, etc.) may wish to train models to predict user behavior in response to advertisements and/or customized content. The service provider may receive large amounts of data daily, which may be correlated to reduce the amount of data to be used in training the model. For example, the service provide may receive 10-20 GB of training data, and after correlating the total 10-20 GB, retain around 1 GB of the total data to train the model on a single computing resource, and then that model may be pushed into production. According to various embodiments, the service provider may not wish to correlate the entire set of 10-20 GB of data into just 1 GB of data. Accordingly, the service provider may have a number of computing resources (e.g, 20 machines) on which models can be trained on. The entire set of data may be randomly or uniformly split into the number of computing resources that the service provider has available. For example, 20 GB of data may be divided evenly among the 20 machines such that each machine uses 1 GB of data each to train a model. Each machine replicates the training process for its 1 GB of data, and the training can be done independently with or without synchronization with the other machines. Without requiring the machines to synchronize with each other, there is no communication or overhead between the machines while the training process is executing, which results in efficient parallel ordinal regression model training. Each machine generates a model when each machine has completed the training process on its portion of data. After each machine has completed the training to generate a model, the service provider can combine the models in a weighted fashion using an estimate of the variance of each model from each machine to compute variance matrixes, which provide a weighting coefficient for each model. The models may then be combined in a linear fashion, where each model has a different weighting coefficient or factor. As a result, the summed model according to embodiments of the invention can, with significantly reduced processing time, replace the single model that would have been generated by a single machine training on the entire set of data.

First, the method according to various embodiments divides the full ordinal data into M parts (adopting the convention of dividing the original training data and then expanding, however in another embodiment, the data may be first expanded and then divided). In some embodiments, data is divided equally, however data may be divided based on size or allocated to specific machines based on various parameters. When the data is divided, each part contains $$n = \frac{N}{M}$$

of the original training set. According to other embodiments, the service provider may divide the entire set of data into portions of different sizes, based on available computing resources, computing or processing capabilities of the resources, etc. Smaller portions of data may have smaller inverse variance, and thus may be weighted less and have a lesser effect to the final resulting summed model. According to various embodiments, the feature dimension D may be fixed so that coefficient estimates from separate parts can be combined, and that storing the inverse variances of D×D dimension may be feasible. According to some embodiments, the method mat select an M that it is not too large to ensure n>D, and an M value that is not too small to ensure benefiting from embodiments of the invention.

Next, according to various embodiments, $(Y_m, X_m)$ denotes the m-th part after the expansion by Equation (2), with instance space dimension being $\tilde{n}=(K-1)n$ and feature space dimension being $\tilde{D}=D^-+K-1$. Thus, $X_m$ may be an $\tilde{n} \times \tilde{D}$ matrix where each row is an expanded instance $x_i^k$, i.e., $X_m = [x_{m,1}^1, \ldots, x_{m,1}^{K-1}, \ldots, x_{m,n}^1, \ldots, x_{m,n}^{K-1}]^T$, and $Y_m$ may be a vector of length $\tilde{n}$, i.e., $Y_m = [y_{m,1}^1, \ldots, y_{m,1}^{K-1}, \ldots, y_{m,n}^1, \ldots, y_{m,n}^{K-1}]^T$. In some embodiments, iterator l=1,... $\tilde{n}$ may be used to iterate through $X_m$ and $Y_m$. For each of the data block, the method may consider the $l_1$ regularized logistic regression which employs the lasso penalty on the loss function to learn the coefficient vector θ:

$$\hat{\theta}_m = \frac{1}{\tilde{n}} \sum_{l=1}^{\tilde{n}} \left\{ \log\left(1 + e^{x_{m,l}^T \theta}\right) - y_{m,l} x_{m,l}^T \theta \right\} + \lambda \|\theta\|_1 \quad (5)$$

where $\|\cdot\|_1$ is the $l_1$ norm and λ is the penalty factor. Equation (5) results in a sparse estimate of regression coefficients $\theta_m$ for the m-th block. According to various embodiments, for example, the Python library sklearn with the liblinear solver may be used to obtain $\hat{\theta}_m$.

Subsequently, according to various embodiments, the method may then calculate a robust inverse variance for each data block, represented by:

$$\sum_{m}^{-1}(\hat{\theta}_m) = X_m^T V_m(\hat{\theta}_m) X_m \qquad (6)$$

where $V_m(\theta)$ is an $\tilde{n} \times \tilde{n}$ diagonal matrix with diagonal elements $v_{1,l} = \sigma(x_{m,l}^T \hat{\theta}_m)(1-\sigma(x_{m,l}^T \hat{\theta}_m))$, $l=1,\ldots,\tilde{n}$. U Using the same diagonal variance matrix, a de-biased coefficient vector may be calculated and represented by:

$$\hat{\theta}_m^c = \hat{\theta}_m + \sum_{m}^{-1}(\hat{\theta}_m) X_m^T (Y_m - \hat{Y}_m) \qquad (7)$$

where $\hat{Y}_m = [\hat{y}_{m,l}, \ldots, \hat{y}_{m,\tilde{n}}]^T$ with $\hat{y}_{m,l} = l = 1, \ldots, \tilde{n}$. The de-biased coefficient vector $\hat{\theta}_m^c$ may be an approximation to the coefficient estimated when $\lambda=0$ (e.g., no penalty loss). Equation (7) provides a convenient way to quickly compute $\hat{\theta}_m^c$ instead of solving Equation (5) at $\lambda=0$. As such, for each data block, after computing $\hat{\theta}_m$ (i.e., estimate of regression coefficients) in Equation (5), then the $\hat{\theta}_m^c$ (i.e., de-biased coefficient vector) may be calculated in Equation (7), and the $$\sum_{m}^{-1}(\hat{\theta}_m)$$

(i.e., robust inverse variance) may be calculated in Equation (6). The estimate of regression coefficients $\hat{\theta}_m$, de-biased coefficient vector $\hat{\theta}_m^c$, and robust inverse variance $$\sum_{m}^{-1}(\hat{\theta}_m)$$

may be obtained for each data block, m=1, ..., M, in parallel.

Lastly, the values from Equations (6) and (7) using the regression coefficient from Equation (5) may be summed to obtain a RIVWA estimate $\hat{\theta}$, represented by:

$$\hat{\theta} = \left\{ \sum_{m=1}^{M} \sum_{m}^{-1}(\hat{\theta}_m) \right\}^{-1} \left\{ \sum_{m=1}^{M} \sum_{m}^{-1}(\hat{\theta}_m) \hat{\theta}_m^c \right\} \qquad (8)$$

Note that when estimating the inverse variance weights, the sparse regularized estimates $\hat{\theta}_m$ may be plugged in to avoid overfitting and ensure numerical robustness of $$\left\{ \sum_{m}^{-1} \right\}_{m=1}^{M}.$$

And the computation of $\hat{\theta}_m$ may serve the purpose of stabilizing the robust inverse variances. However, the average is taken across the de-biased estimates $\{\hat{\theta}_m^c\}_{m=1}^{M}$ to provide unbiasedness and consistency of $\hat{\theta}$. Equation (7) also provides a direct and simple way to use the penalized $\hat{\theta}_m$ to compute the unpenalized counterpart $\hat{\theta}_m^c$ when $\lambda=0$. M may be the total number of subsets of data, with each subset of data being processed by an individual computing resource. As such, m identifies the subset of data, and the robust inverse variance is calculated for each subset or portion of data.

In contrast, the classic inverse variance weighted average (IVWA) uses the unregularized coefficient estimates in calculation of the inverse variance weights, which often leads to overfitting in individual data parts, resulting in predicted probabilities very close to the boundary (i.e., 0 or 1), thus produces inaccurate estimate of parameter variance matrices $$\left\{ \sum_{m}^{-1} \right\}_{m=1}^{M}.$$

According to various embodiments, the consistency and asymptotic normality properties of the RIVWA estimator $\hat{\theta}$ may be represented by Equation (8). First, the asymptotic properties of $\{\hat{\theta}_m^c\}_{m=1}^{M}$ from individual parts may be obtained, then it can be shown that the same properties apply to the combined estimator $\hat{\theta}$. $\theta_0$ may be the unknown true underlying coefficient, which is the limiting value of the coefficient obtained from the benchmark $\hat{\theta}_{BM}$ as $\hat{N} \to \infty$.

In an embodiment, for the m-th block (e.g., subset or portion of data), $\hat{\theta}_m^c$ in Equation (7) may be consistent, i.e., $\hat{\theta}_m^c \xrightarrow{p} \theta_0$, and asymptotically normally distributed, i.e., $\sqrt{\tilde{n}}(\hat{\theta}_m^c - \theta_0) \xrightarrow{d} \mathcal{N}(0, \Sigma_m(\theta_0))$, where $$\sum_{m}^{-1}(\theta_0) = X_m^T V_m(\hat{\theta}_0) X_m.$$

In another embodiment, the combined estimator $\hat{\theta}$ in Equation (8) may have the same consistent and asymptotically normality property as $\hat{\theta}_{BM}$ by the benchmark, i.e., $\hat{\theta} \xrightarrow{p} \theta_0$ and $\sqrt{\overline{N}}(\hat{\theta} - \theta_0) \xrightarrow{d} \mathcal{N}(0, \Sigma(\theta_0))$, with $$\sum^{-1}(\theta_0) = \sum_{m=1}^{M} \sum_{m}^{-1}(\theta_0).$$

Embodiments of the present invention utilize a logistic model, and also show that the parameters due to data expansion enjoy the same properties, which may be valuable to outcome prediction and other applications in ordinal regression. In addition, using results from the combined estimator $\hat{\theta}$ in Equation (8), statistical tests may be conducted on the bias terms $b_1, \ldots b_{K-1}$ to compare the mean expected probabilities of different outcome levels. For each block of data, regression coefficient estimates and variance coefficients may be calculated to provide a weighting value for each of model from each machine, and then the models are combined in a linear fashion.

The following examples illustrate applying the model on various different types of datasets. Here, t DC method according embodiments of the invention were trained on a public insurance dataset, and various additional datasets. Models trained on data implementing the DC method of the present invention are compared with a benchmark and results from prior art DC methods.

For example, the following methods are compared:
- single memory training on full data with batch gradient descent method (benchmark method-BM).
- single memory training on sub-sampled data with batch gradient descent method (50% subsampling-BM 50%).
- single memory training on sub-sampled data with batch gradient descent method (20% subsampling-BM 20%).
- single memory training on full data with follow-the regularized-leader method (FTRL)
- single memory training with mini-batch gradient descent method (MBGD)
- DC with simple average (SA)
- DC with inverse variance weighted average (IVWA)
- DC with majority voting (MV)
- DC with robust inverse variance weighted average and bias correction (RIVWA), our proposed method BM, FTRL and MBGD may utilize in-memory access of the full training data. FTRL and MBGD are stochastic methods, that may include synchronization and data access at every iteration, thus these methods cannot be executed in parallel and are considered as single memory training method. For FTRL, all the instances are iterated; for MBGD, the mini-batches are $\frac{1}{100}$ of the full training data. For BM, results are reported after subsampling of the expanded dataset. BM does not involve regularization, otherwise it will not have a limiting distribution.

For performance evaluation, the following metrics are reported:

(1) absolute difference $d_1$ and squared difference $d_2$ of an estimated coefficient $\hat{\theta}$ to that of the benchmark $\hat{\theta}_{BM}$, $d_1(\hat{\theta}, \hat{\theta}_{BM}) = \|\hat{\theta} - \hat{\theta}_{BM}\|_1$ and $d_2(\hat{\theta}, \hat{\theta}_{BM}) = \|\hat{\theta} - \hat{\theta}_{BM}\|_2^2$;

(2) absolute prediction loss of an estimated $\hat{\theta}$ evaluated on the testing set, defined abs_loss $$\ell(Y_{test}, \hat{\theta}) = \frac{1}{n}\sum_{i=1}^{n} C_{y_i, \hat{y}_i(\hat{\theta})} = \frac{1}{n}\sum_{i=1}^{n} |y_i - \hat{y}_i(\hat{\theta})|;$$

where $y_i$ is the true ordinal label of the i-th instance in $Y_{test}$ and $$\hat{y}_i(\hat{\theta}) = 1 + \sum_{k=1}^{K-1} \mathbb{1}[x_i^{kT}\hat{\theta} > 0]$$

is its predicted label given $\hat{\theta}$;

(3) computation time in seconds, including the time used to read data from divided parts. Time of DC methods is calculated by the maximum time across all parallel procedures plus time used to combine the results. The above metrics are also compared at different choices of M.

Tuning parameters are selected to maximize the absolute prediction loss on the validation set such that for tuning parameter(s) $\lambda \in \mathcal{L}$, $\lambda^*$ is selected such that $$\lambda^* = \arg\min_{\lambda \in \mathcal{L}} \text{abs\_loss}(Y_{valid}, \hat{\theta}_\lambda) \text{ where } \hat{\theta}_\lambda$$

is the coefficient vector obtained at tuning value $\lambda$. A grid search is used for $\lambda \in \{10^{-4}, 10^{-3}, \ldots, 10^3\}$.

Table 1 below shows the results on an insurance dataset. Number of divisions M=100 for DC methods. $d_1$: absolute differences between coefficient estimates of other methods and the benchmark; $d_2$: squared differences between coefficient estimates of other methods and the benchmark; change in abs_loss with respect to benchmark (%): the relative percentage change in absolute prediction loss with respect to benchmark (the smaller the better); time: computation time in seconds. Results are averaged across 10 repeated experiments and reported as mean±sd. Best results are highlighted in bold.

TABLE 1

| Methods | $d_1(\hat{\theta},\hat{\theta}_{BM})$ | $d_2(\hat{\theta},\hat{\theta}_{BM})$ | Change in abs_loss w.r.t BM (%) | Time (sec) |
|---|---|---|---|---|
| Single memory | | | | |
| BM | 0.00 | 0.00 | 0.00 | 63.3 ± 1.9 |
| BM 50% | 2.68 ± 0.37 | 0.16 ± 0.07 | 0.49 ± 0.21 | 22.7 ± 0.6 |
| BM 20% | 5.82 ± 1.00 | 0.79 ± 0.66 | 2.14 ± 0.64 | 6.4 ± 0.3 |
| FTRL | 5.56 ± 0.21 | 0.51 ± 0.03 | 1.72 ± 0.40 | 109.8 ± 1.0 |
| MBGD | 4.63 ± 0.26 | 0.32 ± 0.04 | 0.64 ± 0.18 | 117.3 ± 20.2 |
| DC with M = 100 | | | | |
| SA | 11.45 ± 0.78 | 2.09 ± 0.29 | 1.23 ± 0.51 | 1.0 ± 0.1 |
| IVWA | 4.24 ± 0.19 | 0.33 ± 0.02 | 0.88 ± 0.15 | 1.0 ± 0.1 |
| MV | 4.23 ± 0.15 | 0.38 ± 0.01 | 0.72 ± 0.18 | 1.7 ± 0.4 |
| RIVWA | 1.60 ± 0.06 | 0.05 ± 0.002 | 0.29 ± 0.14 | 0.4 ± 0.1 |

The outcome of interest is an 8-level ordinal rating related to some undisclosed decision associated with an application in an insurance service provider. The dataset contains 59,381 labeled instances and has 144 features. The dataset was randomly split into 60% for training, 10% for validation, and 30% for testing.

Table 1 shows the results of comparison across different methods. Results in the table are reported as mean and standard deviation from 10 replications of randomized train-validation-test splits. Not only does the RIVWA method of the present invention produce the closest coefficient estimates to the benchmark in terms of $d_1$ and $d_2$, it also achieves very good prediction performance in terms of abs_loss($Y_{test}$, $\hat{\theta}$). Additionally, the computational time is less than $\frac{1}{100}$ that of the benchmark method, and similar to other DC methods.

FIGS. 3(a)-3(d) show the relative change of $d_1$, $d_2$, abs_loss and time at different values of M. It can be seen that performance of the method of the present invention remains stable against different choices of M whereas other DC methods show worse performance as M gradually increases, especially for SA and IVWA. DC methods only require one pass of the entire data, thus are much faster than the iterative methods. The time of DC methods can depend on the number of parallel jobs. In this case, given N fixed, the computation time in general has a decreasing trend as M increases, assuming M parallel jobs can be executed all at once. Additionally, when M is small, the performance of different DC methods can be very similar, because the sample size in each data division is large enough to provide good estimates. The most extreme case is when M=1, where all DC methods should perform as good as the benchmark, but with higher computational cost.

Another dataset used to illustrate the DC techniques of the present invention is trained on a popular public movie rating dataset containing 20,000,263 movie ratings by 138,493 users of 27,278 movies from 1995-2015. The following features are used for modeling: user ID, movie ID, rate year, movie year, genre categories, user tags and genome tags with relevance above 0:8.

Different from the insurance dataset where the feature space dimension is fixed and small; the total number of features in this example is much larger than N and highly sparse. In order to estimate the variance of coefficients, the hashing trick is applied so that the features are reduced to a space of fixed dimension, which is fixed at $2^{10}=1,024$. Having a fixed feature space with lower dimension may be important for all types of inverse variance weighted methods, i.e., IVWA, MV and RIVWA, because the inverse variance matrix from each data division may be each stored in memory, which is a $\tilde{D} \times \tilde{D}$ matrix. If $\tilde{D}$ grows with $\tilde{N}$, the challenge in storing $\tilde{D} \times \tilde{D}$ weighting matrices compromises the scalability of inverse variance weighted DC methods.

In this illustrative example, each movie has a score from 0.5 to 5.0 with 0.5 increments (10 ordinal levels). The data expansion will increase the data size 9 times. Here, a subsample of around 1,000,000 instances is used, which expands to 9,000,000 binary instances. Similarly, the data processing system may split the data as training, validation and testing set, with 60% for training, 10% for validation, and 30% for testing. Thus the expanded training sample size is $\tilde{N} \approx 6;000;000$. The training data is divided into M=1000 parts. Results are shown in Table 2 where similar performance metrics as before are reported and compared between the different types of DC methods and the benchmark.

FIGS. 3(a)-(d) illustrate the performance of different methods on the insurance dataset at M=20, 40, 60, 80, 100 for DC methods. Results are averaged across 10 repeated experiments. Metrics $d_1$, $d_2$ and abs_loss of BM are not affected by the choice of M.

While an ordinal regression ranking problem naturally leads to an expanded dataset, the DC technique according to embodiments may be applicable to general logistic regression for binary classification problems. The DC technique according to embodiments may be applied to a public advertisement dataset, which only has two outcomes, conversion from click versus no conversion. The dataset has 15,898,883 instances. Due to memory limit restrictions when computing BM, the dataset was randomly sampled to N=2,120,698 for training: 212,070 for validation and 848,277 for testing. There are 8 continuous count features and 9 categorical features in this data. Initially, the method bucketizes the counts into the nearest integer of their natural logged values. Then the same hashing trick as in movie ratings dataset may be applied by mapping the features into a size of D=1;024. Model tuning parameters may be selected to maximize the AUC.

FIGS. 4(a)-(b) illustrate the results of training models according to embodiments of the invention on an advertising dataset. The area under curves results of advertising dataset across multiple DC methods in comparison to BM. From Table 2, it can be seen that both RIVWA and MV have predictions very close to BM, and RIVWA has the closest coefficient estimate to BM.

Table 2 shows results for BM and DC methods at M=200 and M=1000. Since the result is binary, both AUC and absolute prediction loss are reported. When M=200, the prediction performance may be very similar for all types of DC methods. However, when M=1000, only RIVWA and SA preserves comparable performance as BM. In all cases, RIVWA has the smallest deviation from BM in terms of coefficient estimation. FIGS. 4(a)-(b) shows the ROC curves of the different methods at M=200 and M=1000. The RIVWA method of the present invention achieves similar performance in prediction as that of BM in both cases.

Table 2 below provides the results on the movie rating dataset, advertising conversion dataset, and an E-commerce advertising funnel dataset. The smaller the $d_1(\hat{\theta}, \hat{\theta}_{BM})$, $d_2(\hat{\theta}, \hat{\theta}_{BM})$ and percentage change in abs_loss, the better. The larger the AUC, the better. AUC is only available for the advertising dataset because it has binary (two level) outcomes.

TABLE 2

| Methods | $d_1(\hat{\theta},\hat{\theta}_{BM})$ | $d_2(\hat{\theta},\hat{\theta}_{BM})$ | Change in abs_loss w.r.t BM (%) | AUC | Time (sec) |
|---|---|---|---|---|---|
| MovieLens | | | | | |
| BM | 0.00 | 0.00 | 0.00 | — | 953.2 |
| DC with M = 1000 | | | | | |
| SA | 976.5 | 3245.64 | 7.21 | — | 11.1 |
| IVWA | 89.22 | 22.17 | 3.12 | — | 11.6 |
| MV | 79.59 | 17.07 | −0.02 | — | 0.8 |
| RIVWA | 8.40 | 0.47 | 0.04 | — | 1.7 |
| Criteo | | | | | |
| BM | 0.00 | 0.00 | 0.00 | 0.81 | 71.1 |
| DC with M = 200 | | | | | |
| SA | 61.00 | 8.40 | 0.31 | 0.81 | 0.7 |
| IVWA | 40.30 | 3.13 | 0.19 | 0.81 | 1.0 |
| MV | 36.34 | 2.61 | 0.19 | 0.81 | 3.6 |
| RIVWA | 19.60 | 0.72 | 0.14 | 0.81 | 2.4 |
| DC with M = 1000 | | | | | |
| SA | 2850.43 | 15755.89 | 0.95 | 0.80 | 0.6 |
| IVWA | 172.53 | 53.08 | 35.55 | 0.70 | 1.1 |
| MV | 180.84 | 61.38 | 25.42 | 0.71 | 0.1 |
| RIVWA | 46.30 | 4.76 | −0.15 | 0.81 | 1.2 |
| E-commerce | | | | | |
| BM | 0.00 | 0.00 | 0.00 | — | 635.4 |
| DC with M = 1000 | | | | | |
| SA | 746.08 | 1979.43 | −12.44 | — | 1.3 |
| IVWA | 73.71 | 36.18 | 199.76 | — | 1.8 |
| MV | 108.11 | 29.01 | −18.96 | — | 1.0 |
| RIVWA | 79.09 | 29.75 | −27.47 | — | 1.4 |

Table 2 also illustrates the results on an e-commerce advertisement dataset from an online marketplace service provider. The e-commerce dataset consists of 3 ordinal levels: an ad impression on a publisher website which did not lead to a click (k=1), an ad impression which led to a click but did not lead to any product purchase (k=2) and an ad impression which led to a click followed by a product purchase (k=3). For example, a purchase may be valued more than a click, which may be valued more than an impression which did not lead to a click (thus, a natural ordinal ranking is induced).

In this example, for training, the impression, click, and purchase data are collected over a period of 1 week (with 2 day click attribution and 7 day purchase attribution). A single day's data may be used for validation and another day's data for testing. The number of instances and features are in the millions and the same hashing function is applied to project the original feature space into a fixed dimensional space. The training data may be randomly divided into M=1000 parts.

Table 2 shows results of different DC methods, including the RIVWA of the present invention, as well as the benchmark. It can be seen that RIVWA has the improved prediction accuracy in terms of absolute prediction loss, and its estimate is close to that of benchmark. Although IVWA yields similar performance in terms of $d_1$ and $d_2$ to the DC method according to various embodiments, it has a much larger prediction loss compared to the RIVWA of the present invention.

RIVWA consistently shows improved performance in terms of parameter estimation, as supported by the theoretical results. The RIVWA DC method according to various embodiments provides good prediction. Parameter estimation is important to downstream usage of the estimated coefficients for purposes such as ranking prediction, calibration and estimation of probabilities. Thus ensuring coefficient estimates for divide-and-conquer methods to be as close as the benchmark is important. A limitation of our method, as is for all variance-dependent DC methods, is that it requires the feature space to be fixed in dimension. For feature spaces that are not known in advance, the hashing function is applied for dimension reduction. Hashing can improve results when the original feature space is very large and the occurrence of features is sparse.

Various embodiments of the present invention provide a DC based algorithm to overcome scalability issue in training an ordinal regression model. The RIVWA DC method according to various embodiments may not be tied to any specific property of ordinal regression. Instead, the DC algorithm according to various embodiments applies to any logistic classification problem, where the size of training set is too big to train a model on a single machine. The motivation for considering ordinal regression problem is that ordinal to binary reduction method necessarily expands the data set, in order of number of ordinal outcomes, and can even turn a moderate sized training set too large.

Various embodiments of the present invention provide a method to divide the expanded binary classification dataset, resulting from the reduction step of existing technology, train individual regularized logistic classifiers on the blocks of data, and combine the classifiers in an efficient way to get an ordinal regression model. The DC method according to various embodiments removes the need for synchronization between learning algorithms on the data blocks and thus, the learning algorithms can run in parallel, on distributed data frameworks.

According various embodiments, model coefficients from the DC method of the present invention is consistent with the logistic model which is trained on a single machine on the entire dataset and asymptotically normally distributed. Furthermore, comparing the model, produced by the DC technique of the present invention, on multiple datasets, improvement is shown in estimation and prediction performance, as well as reduction in training time, over other existing methods.

Figure 5:
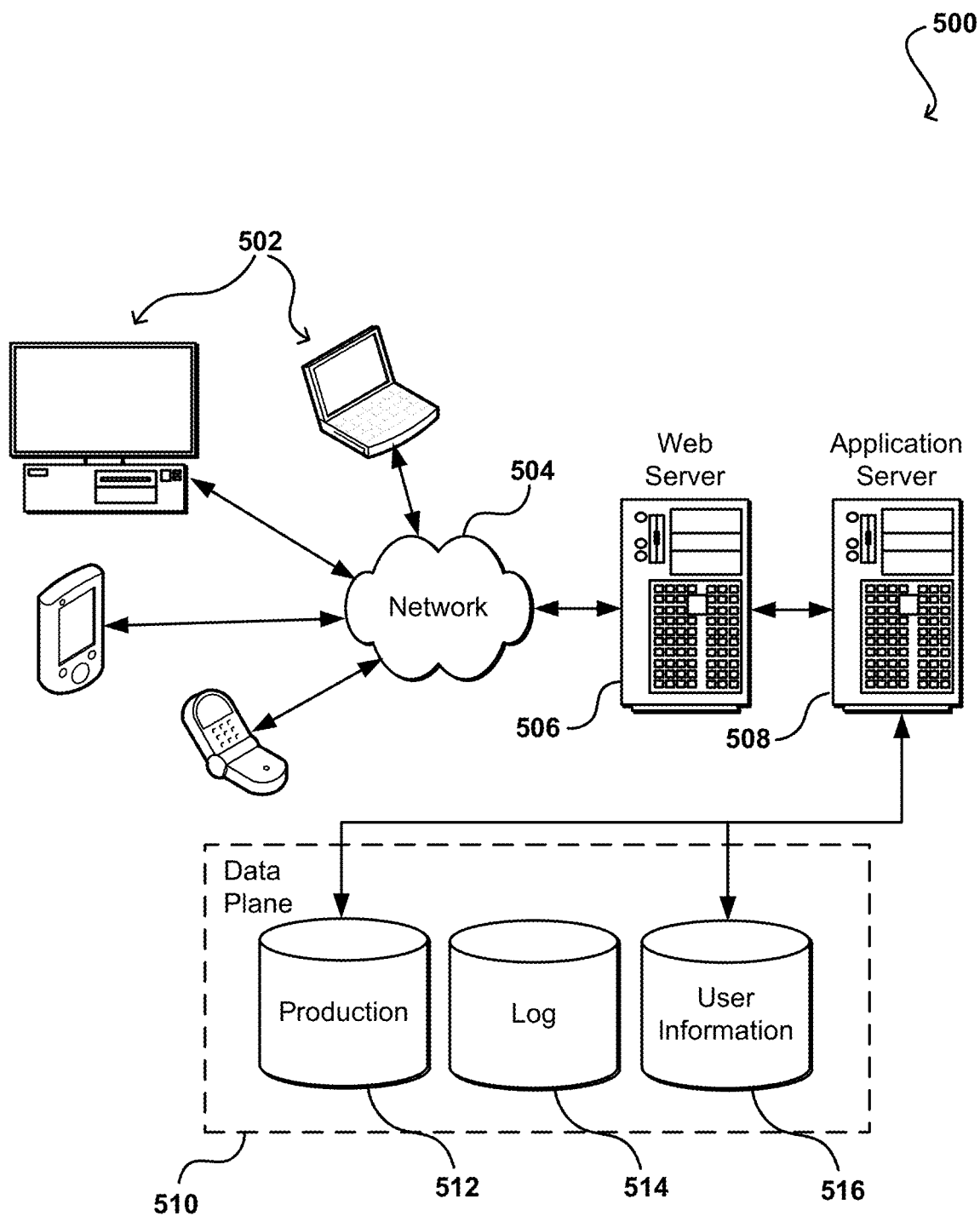
FIG. 5 illustrates an environment in which various embodiments can be implemented.

FIG. 5 illustrates an example of an environment 500 for implementing aspects in accordance with various embodiments. As will be appreciated, although a Web-based environment is used for purposes of explanation, different environments may be used, as appropriate, to implement various embodiments. An electronic client device 502 can include any appropriate device operable to send and receive requests, messages, or information over an appropriate network 504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 506 for receiving requests and serving content in response thereto, although for other networks an alternative device serving a similar purpose could be used as would be apparent to one of ordinary skill in the art.

The illustrative environment includes at least one application server 508 and a plurality of resources, servers, hosts, instances, routers, switches, data stores, and/or other such components defining what will be referred to herein as a data plane 540, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 506, application server 508 and similar components can be considered to be part of the data plane. The handling of all requests and responses, as well as the delivery of content between the client device 502 and the application server 508, can be handled by the Web server. It should be understood that the Web and application servers are not required and are merely example components, as structured code can be executed on any appropriate device or host machine as discussed elsewhere herein.

The data stores of the data plane 540 can include several separate data tables, databases, or other data storage mechanisms and media for storing data relating to a particular aspect. For example, the data plane illustrated includes mechanisms for storing production data 512 and user information 416, which can be used to serve content for the production side. The data plane also is shown to include a mechanism for storing log data 514, which can be used for purposes such as reporting and analysis of the user data, including gathering and aggregating the large amounts of data from multiple users on the network. It should be understood that there can be many other aspects that may need to be stored in a data store, such as for page image information and access right information, which can be stored in any of the above listed mechanisms as appropriate or in additional mechanisms in the data plane 540. The data plane 540 is operable, through logic associated therewith, to receive instructions from the application server 508 and obtain, update, or otherwise process data, instructions, or other such information in response thereto. In one example, a user might submit a search request for a certain type of item. In this case, components of the data plane might access the user information to verify the identity of the user, gather user information, and access the catalog detail information to obtain information about items of that type. The information then can be returned to the user, such as in a results listing on a Web page that the user is able to view via a browser on the user device 502. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature, and not limiting to the scope of the disclosure.

An environment such as that illustrated in FIG. 5 can be useful for various content providers or other such entities, wherein multiple hosts and various types of resources might be used to perform tasks such as serving content, authenticating users, gathering user data and information, analyzing and aggregating user data, predicting user behavior, allocating resources, or performing any of a number of other such tasks. Some of these hosts may be configured to offer similar functionality, while other servers might be configured to perform at least some different functions.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase °, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for processing data, comprising:
    obtaining, by one or more computer systems, a set of data to be processed to train a model to predict user behavior, the set of data including raw ordinal data;
    identifying a number of available computing resources to process the set of data;
    dividing the set of data into two or more subsets of data based at least in part on the number of available computing resources;
    calculating, for each subset of data, an estimate of regression coefficients based at least in part on a matrix representing each subset of data, a normalization of a regularized logistic regression, and a penalty factor, the estimate of regression coefficients representing a rate of change in each subset of data;
    calculating, for each subset of data, a robust inverse variance based at least in part on the matrix, the robust inverse variance representing a variance of each subset of data;
    calculating, for each subset of data, a de-biased coefficient vector based at least in part on the matrix;
    determining a weighted average value for the set of data based at least in part on the inverse variance and the de-biased coefficient vector for each subset of data; and
    training the model to predict user behavior.

2. The computer-implemented method of claim 1, wherein the estimate of regression coefficients is calculated by:

$$\hat{\theta}_m = \frac{1}{n} \sum_{l=1}^{n} \left\{ \log\left(1 + e^{x_{m,l}^T \theta}\right) - y_{m,l} x_{m,l}^T \theta \right\} + \lambda \|\theta\|_1$$

wherein $\hat{\theta}_m$ is the estimate of regression coefficients for iterator m from 1 to M, wherein M is a number of subsets of data, wherein $\|\theta\|_1$ is the normalization of the regularized logistic regression, wherein [x, y] represent the matrix, for iterator l from 1 to n, wherein n is a number of rows in the matrix, and wherein λ is the penalty factor.

3. The computer-implemented method of claim 2, wherein the robust inverse variance is calculated by:

$$\sum_m^{-1}(\hat{\theta}_m) = X_m^T V_m(\hat{\theta}_m) X_m,$$

wherein (X, Y) represent an expansion of the matrix.

4. The computer-implemented method of claim 3, wherein the de-biased coefficient vector is calculated by:

$$\hat{\theta}_m^c = \hat{\theta}_m + \sum_m^{-1}(\hat{\theta}_m) X_m^\top (Y_m - \hat{Y}_m),$$

wherein $\hat{\theta}_m^c$ is the de-biased coefficient vector.

5. The computer-implemented method of claim 4, wherein the weighted average value is calculated by:

$$\hat{\theta} = \left\{ \sum_{m=1}^{M} \sum_m^{-1}(\hat{\theta}_m) \right\}^{-1} \left\{ \sum_{m=1}^{M} \sum_m^{-1}(\hat{\theta}_m) \hat{\theta}_m^c \right\}.$$

6. A computer-implemented method for processing data, comprising:
    obtaining, by one or more computer systems, a set of data to train a model to predict user behavior;
    dividing the set of data into two or more subsets of data;
    calculating, for each subset of data, an estimate of regression coefficients based at least in part on a normalization of a regularized logistic regression;
    calculating, for each subset of data, an inverse variance;
    calculating, for each subset of data, a de-biased coefficient vector;
    determining, for each subset of data, a training value including the inverse variance and the de-biased coefficient vector;
    combining the training value for each subset of data; and
    training the model to predict user behavior.

7. The computer-implemented method of claim 6, further comprising:
    determining a number of computing resources to process the data; and
    dividing the set of data based at least in part on the number of computing resources.

8. The computer-implemented method of claim 7, further comprising:
    analyzing one or more specifications of each machine in the number of machines;
    determining a capacity of data for each machine based at least in part on the one or more specification; and
    dividing the set of data based at least in part on the capacity of each machine.

9. The computer-implemented method of claim 7, wherein each machine in the number of machines processes data independently without synchronization.

10. The computer-implemented method of claim 6, wherein the estimate of regression coefficients is calculated by:

$$\hat{\theta}_m = \frac{1}{n} \sum_{l=1}^{n} \left\{ \log\left(1 + e^{x_{m,l}^T \theta}\right) - y_{m,l} x_{m,l}^T \theta \right\} + \lambda \|\theta\|_1$$

wherein $\hat{\theta}_m$ is the estimate of regression coefficients for iterator m from 1 to M, wherein M is a number of subsets of data, wherein $\|\theta\|_1$ is the normalization of a regularized logistic regression, wherein [x, y] represent the matrix, for iterator l from 1 to n, wherein n is a number of rows in the matrix, and wherein X, is a penalty factor.

11. The computer-implemented method of claim 10, wherein the inverse variance is calculated by:

$$\sum_{m}^{-1} (\hat{\theta}_m) = X_m^T V_m(\hat{\theta}_m) X_m,$$

wherein (X, Y) represent an expansion of the matrix.

12. The computer-implemented method of claim 11, wherein the de-biased coefficient vector is calculated by:

$$\hat{\theta}_m^c = \hat{\theta}_m + \sum_{m}^{\wedge} (\hat{\theta}_m) X_m^\top (Y_m - \hat{Y}_m),$$

wherein $\hat{\theta}_m^c$ is the de-biased coefficient vector.

13. The computer-implemented method of claim 12, wherein the training value is calculated by:

$$\hat{\theta} = \left\{ \sum_{m=1}^{M} \sum_{m}^{-1} (\hat{\theta}_m) \right\}^{-1} \left\{ \sum_{m=1}^{M} \sum_{m}^{-1} (\hat{\theta}_m) \hat{\theta}_m^c \right\}.$$

14. A non-transitory computer readable storage medium storing instructions for processing data, the instructions when executed by a processor causing the processor to:
obtain, by one or more computer systems, a set of data to train a model to predict user behavior;
divide the set of data into two or more subsets of data;
calculate, for each subset of data, an estimate of regression coefficients based at least in part on a normalization of a regularized logistic regression;
calculate, for each subset of data, an inverse variance;
calculate, for each subset of data, a de-biased coefficient vector;
determine, for each subset of data, a training value including the inverse variance and the de-biased coefficient vector;
combine the training value for each subset of data; and
train the model to predict user behavior.

15. The non-transitory computer readable storage medium of claim 14, wherein the instructions when executed further cause the processor to:
determine a number of computing resources to process the data;
divide the set of data based at least in part on the number of computing resources;
analyze one or more specifications of each machine in the number of machines;
determine a capacity of data for each machine based at least in part on the one or more specification; and
divide the set of data based at least in part on the capacity of each machine.

16. The non-transitory computer readable storage medium of claim 14, wherein each machine in the number of machines processes data independently without synchronization.

17. The non-transitory computer readable storage medium of claim 14, wherein the estimate of regression coefficients is calculated by:

$$\hat{\theta}_m = \frac{1}{n} \sum_{l=1}^{n} \left\{ \log\left(1 + e^{x_{m,l}^\top \theta}\right) - y_{m,l} x_{m,l}^\top \theta \right\} + \lambda \|\theta\|_1$$

wherein $\hat{\theta}_m$ is the estimate of regression coefficients for iterator m from 1 to M, wherein M is a number of subsets of data, wherein $\|\theta\|_1$ is the normalization of a regularized logistic regression, wherein [x, y] represent the matrix, for iterator l from 1 to n, wherein n is a number of rows in the matrix, and wherein λ is a penalty factor.

18. The non-transitory computer readable storage medium of claim 17, wherein the inverse variance is calculated by:

$$\sum_{m}^{-1} (\hat{\theta}_m) = X_m^\top V_m(\hat{\theta}_m) X_m,$$

wherein (X, Y) represent an expansion of the matrix.

19. The non-transitory computer readable storage medium of claim 18, wherein the de-biased coefficient vector is calculated by:

$$\hat{\theta}_m^c = \hat{\theta}_m + \sum_{m}^{\wedge} (\hat{\theta}_m) X_m^\top (Y_m - \hat{Y}_m),$$

wherein $\hat{\theta}_m^c$ is the de-biased coefficient vector.

20. The non-transitory computer readable storage medium of claim 19, wherein the training value is calculated by:

$$\hat{\theta} = \left\{ \sum_{m=1}^{M} \sum_{m}^{-1} (\hat{\theta}_m) \right\}^{-1} \left\{ \sum_{m=1}^{M} \sum_{m}^{-1} (\hat{\theta}_m) \hat{\theta}_m^c \right\}.$$

* * * * *